(12) United States Patent
Samih et al.

(10) Patent No.: US 9,390,010 B2
(45) Date of Patent: Jul. 12, 2016

(54) CACHE MANAGEMENT

(71) Applicant: Intel Corporation, Santa Clara, CA (US)

(72) Inventors: Ahmad Samih, Beaverton, OR (US); Ren Wang, Portland, OR (US); Christian Maciocco, Portland, OR (US); Sameh Gobriel, Hillsboro, OR (US); Tsung-Yuan Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 13/715,526

(22) Filed: Dec. 14, 2012

(65) Prior Publication Data

US 2014/0173221 A1     Jun. 19, 2014

(51) Int. Cl.
*G06F 12/08*        (2006.01)

(52) U.S. Cl.
CPC ........ *G06F 12/0804* (2013.01); *G06F 12/0888* (2013.01); *Y02B 60/1225* (2013.01)

(58) Field of Classification Search
CPC ............ G06F 11/1451; G06F 11/2064; G06F 11/2082; G06F 12/12; G06F 12/08; G06F 12/122; G06F 12/02; G06F 12/10; G06F 12/0238; G06F 17/30215; G06F 17/30578; G06F 2201/84
See application file for complete search history.

(56) References Cited

U.S. PATENT DOCUMENTS

| | | | |
|---|---|---|---|
| 8,555,000 B2 * | 10/2013 | Jo .......................... | G06F 12/126 711/103 |
| 8,984,179 B1 * | 3/2015 | Cardona ................. | G06F 13/28 710/1 |
| 2005/0114605 A1 * | 5/2005 | Iyer ...................... | G06F 12/0888 711/133 |
| 2005/0138232 A1 * | 6/2005 | Tamura ............... | G06F 12/0808 710/22 |
| 2007/0174551 A1 * | 7/2007 | Cornwell ............ | G06F 12/0888 711/118 |
| 2008/0046604 A1 * | 2/2008 | Jhan ........................ | G06F 3/061 710/22 |
| 2008/0054897 A1 * | 3/2008 | Crolly et al. ................... | 324/252 |
| 2008/0082769 A1 * | 4/2008 | Bouchou et al. .............. | 711/161 |
| 2008/0168220 A1 * | 7/2008 | Gill ...................... | G06F 12/0804 711/113 |
| 2009/0172315 A1 * | 7/2009 | Iyer et al. ....................... | 711/158 |
| 2010/0228922 A1 * | 9/2010 | Limaye ............... | G06F 12/0897 711/135 |
| 2010/0332698 A1 * | 12/2010 | Muller .................... | H04L 49/90 710/57 |
| 2011/0072218 A1 * | 3/2011 | Manne et al. ................. | 711/136 |
| 2011/0113200 A1 * | 5/2011 | Moses et al. .................. | 711/130 |
| 2011/0119451 A1 * | 5/2011 | Fuller ................. | G06F 12/0802 711/144 |
| 2011/0153876 A1 * | 6/2011 | Caffee .................... | G06F 13/28 710/22 |
| 2011/0296112 A1 * | 12/2011 | Li et al. ......................... | 711/128 |
| 2013/0111144 A1 * | 5/2013 | Koradhanyamath et al. . | 711/135 |

* cited by examiner

*Primary Examiner* — Jared Rutz
*Assistant Examiner* — Jean Edouard
(74) *Attorney, Agent, or Firm* — International IP Law Group, P.L.L.C.

(57) ABSTRACT

The present disclosure provides techniques for cache management. A data block may be received from an IO interface. After receiving the data block, the occupancy level of a cache memory may be determined. The data block may be directed to a main memory if the occupancy level exceeds a threshold. The data block may be directed to a cache memory if the occupancy level is below a threshold.

29 Claims, 4 Drawing Sheets

CACHE MANAGEMENT

TECHNICAL FIELD

The present disclosure relates to data storage. In particular, the present invention relates to directing data to storage based on cache occupancy.

BACKGROUND

Data Direct IO technology (DDIO) is a platform technology that reduces the number of accesses to main memory. DDIO improves data processing efficiency for data delivery and data consumption by the processor. With DDIO, incoming data may be sent directly to a cache memory, such as the processor last level cache (LLC) without a detour via system memory. Bypassing the main memory and making the processor cache the primary destination and source of data can reduce latency and power consumption and improve overall system performance.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Embodiments disclosed herein provide techniques for managing a processor cache. The cache management techniques described herein enable I/O interfaces such as Ethernet controllers and adapters to transfer data directly to and from the processor cache through direct memory access (DMA). Thus, the processor cache is the primary destination and source of IO data rather than the main memory, helping to deliver a variety of advantages, including but not limited to, increased bandwidth, lower latency, and reduced power consumption. In some cases, the IO stream input rate may at times exceed the IO thread consumption rate. In such cases, incoming IO data may cause data that has not yet been processed to be evicted from the cache, resulting in possible cache miss when the evicted data is later requested. When the IO thread is ready to process the evicted data, the data is no longer present in the processor cache and must be fetched from main memory upon request. This fetching process can reduce the efficiency of a processor and increase platform power consumption due to extra block movements.

The reduced efficiency may be illustrated by a gap between the processor service speed and the speed at which data blocks are installed in the processor cache. The gap may be measured in cycles and may represent the speed of data processing in relation to the speed of installing blocks. If data blocks are installed faster than the data blocks are processed, this can result in a high cache miss rate, which is defined as the number of cache misses per cache requests. In an example, if a processor processes data stored in the processor cache before a new data block arrives in the cache, the gap may be 0 cycles and the miss rate may be 0 percent. If a processor finishes processing a data block 1 cycle after a second data block arrives (a 1 cycle gap), the miss rate may be as high as 80 percent. At a gap of 8 cycles, the miss rate may be as high as to 95 percent. Thus, it can be appreciated that the cache miss rate drops significantly once the processor service rate goes below the data block input speed. By determining the data block destination dynamically, i.e. selecting the data block destination based on the cache occupancy level, the effectiveness and efficiency of DDIO may be significantly increased. In some embodiments, the occupancy level determines whether the data block is sent to the processor cache or the main memory. In this way, the majority of data blocks allocated in the processor cache may be consumed before the data blocks are evicted. As such, multiple reads from and writes to system memory may be avoided, resulting in reduced latency, increased system IO bandwidth, and reduced platform power consumption.

Figure 1:
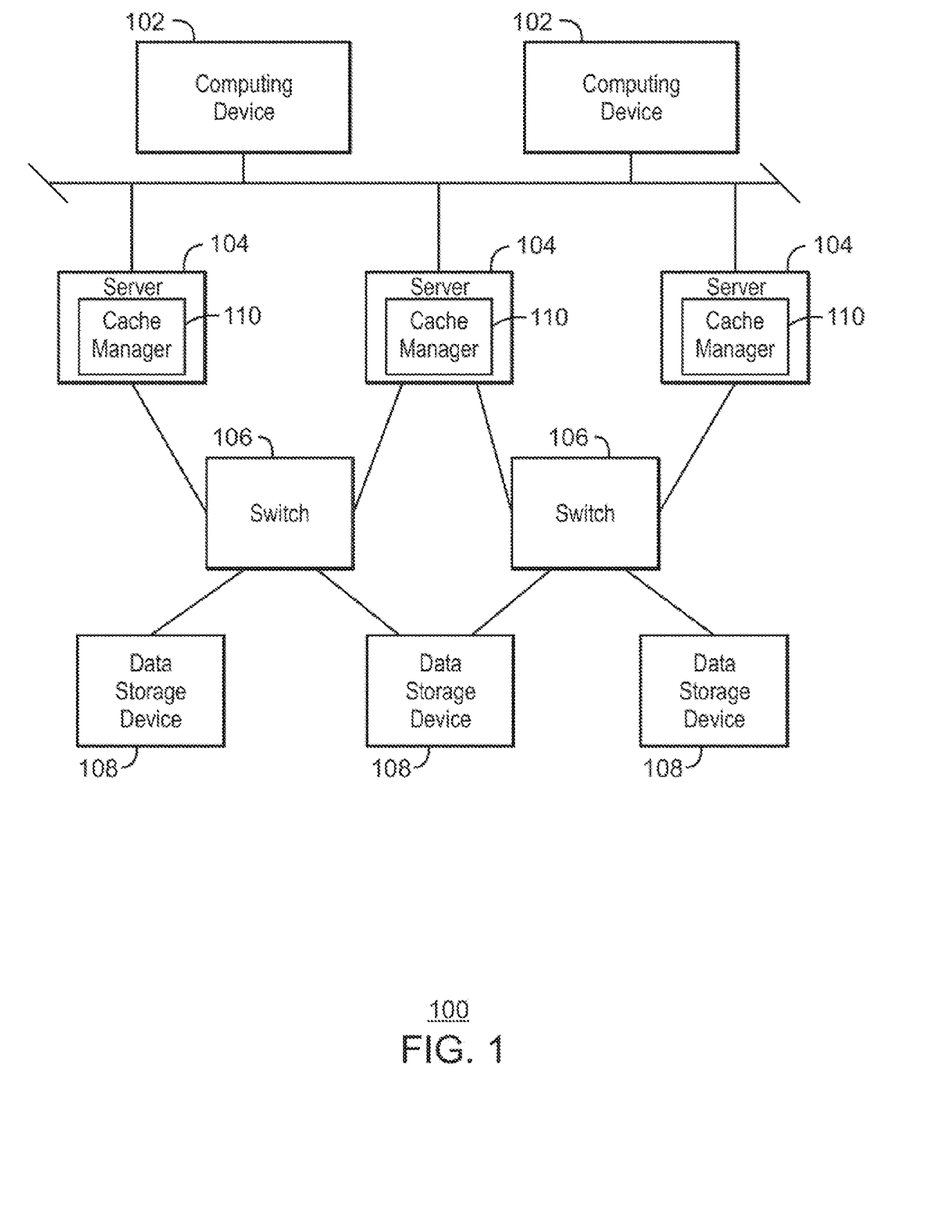
FIG. 1 is a block diagram of a server network.

FIG. 1 is a block diagram of a server network. The server network 100 may include a number of client computing devices 102 coupled to a number of servers 104 via a network, such as an Ethernet network, for example. The server network 100 may be any suitable type of network, such as a Storage Area Network (SAN), Direct Attached Storage (DAS) network, enterprise network, and the like.

The servers 104 can be coupled to a switching fabric that includes switches 106. The switching fabric enables the servers 104 to communicate with one another and with any number of storage devices 108, such as storage arrays, and the like. The servers can communicate through the fabric using any suitable I/O protocol, including PCIe, among others. In embodiments, one or more of the servers 104 use Data Direct IO technology (DDIO) to process data packets received through the fabric.

Each of the servers 104 may include a cache manager 110 to control the flow of data packets into and out of a cache memory (not shown). For example, the cache manger 110 can determine whether to transfer data blocks to a cache memory of the server or main system memory of the server, based on an occupancy level of cache. The cache manager 110 may also track the occupancy of the cache memory.

The block diagram of FIG. 1 is not intended to indicate that the server network 100 is to include all of the components shown in FIG. 1. Further, the computing device 100 may include any number of additional components not shown in FIG. 1, depending on the details of the specific implementation.

Figure 2:
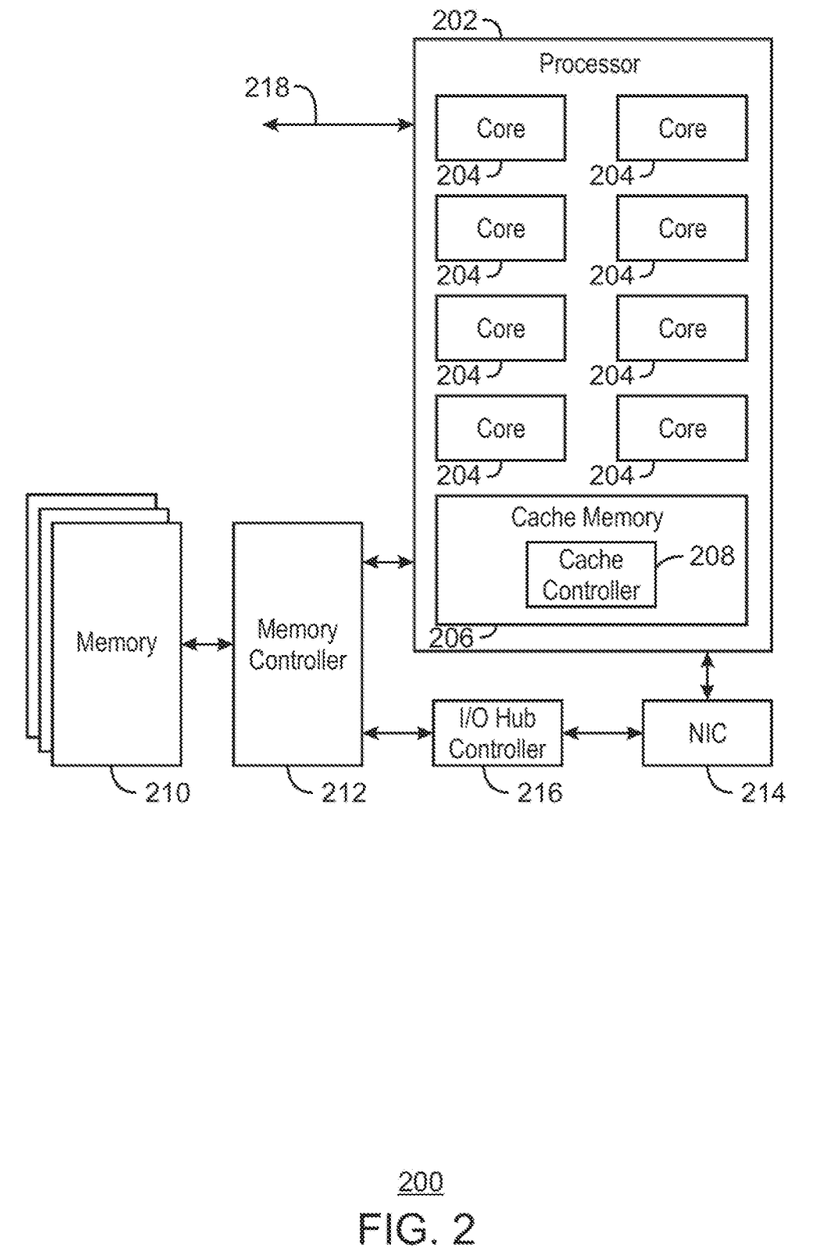
FIG. 2 is a block diagram of a computing device.

FIG. 2 is a block diagram of a computing device. The computing device 200 may be, for example, a laptop computer, desktop computer, tablet computer, mobile device, or server, such as server 114, among others. The computing device 200 may include a processor 202 that is configured to execute stored instructions. The processor 202 may include a core 204. In an example, the processor 202 may include a single core 204 or multiple cores 204. In addition, the processor may be a computing cluster, or any number of other configurations.

The processor 202 may further include a cache memory 206. The cache memory 206 may be a relatively small memory that is quickly accessed. In an example, the cache memory 206 may be a multi-level cache. In another example, the cache memory 206 may be a last level cache (LLC). The processor 202 may interact with the cache memory 206 via a cache controller 208. The cache controller 208 tracks the occupancy level of the cache memory 206. As used herein, the term occupancy level refers to the amount of cache memory that is in use relative to the overall amount of cache memory available.

The computing device 200 may include a memory device 210, which may store instructions that are executable by the processor 202. The memory device 210 can include random access memory (RAM), read only memory (ROM), flash memory, or any other suitable memory systems. For example, the memory device 210 may include dynamic random access memory (DRAM). The processor 202 may be coupled to the main memory 210 by a bus. The processor 202 may communicate with the memory device 210 through a memory controller 212.

The computing device 200 may also include a network interface controller (NIC) 214 that may be configured to connect the computing device 200 to a network (not shown), such as through a bus. In an example, the bus may be a PCIe connection. The network may be a wide area network (WAN), local area network (LAN), or the Internet, among others.

The NIC 214 may be coupled to the memory device 210. In an example, the NIC 214 may communicate with the memory controller 212 via a controller 216, such as via an IO hub controller.

The block diagram of FIG. 2 is not intended to indicate that the computing device 200 is to include all of the components shown in FIG. 2. Further, the computing device 200 may include any number of additional components not shown in FIG. 2, depending on the details of the specific implementation.

Figure 3:
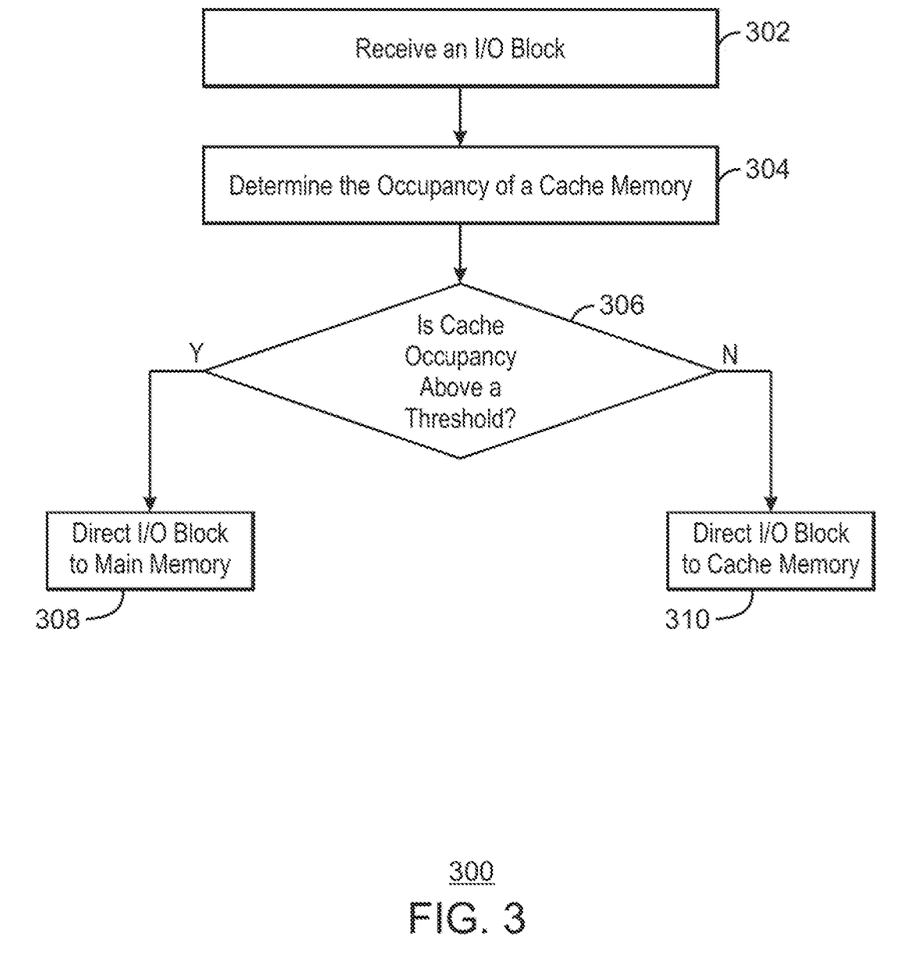
FIG. 3 is a process flow diagram of a method of directing data.

FIG. 3 is a process flow diagram of a method of directing data to a processor cache. The method 300 may be implemented by logic included, for example, in the computing device 200 of FIG. 2. The logic is embodied in hardware, such as logic circuitry or one or more processors configured to execute instructions stored in a non-transitory, computer-readable medium, for example. The method may begin at block 302, wherein a data block is received. The data block may be received from an interface, such as an Input/Output (IO) interface.

At block 304, the occupancy level of a cache memory may be determined. For example, the occupancy level may be tracked by an occupancy counter (OC). The occupancy counter may be implemented in the cache controller. The occupancy counter may track the occupancy level of the cache memory by tracking the number of data blocks directed to the cache memory and the number of data blocks processed from the cache memory. In particular, the occupancy counter may increase an occupancy level indicator corresponding to an occupancy level when a data block is directed to the cache memory and may decrease the occupancy level indicator when a data block is processed. As such, the occupancy counter may be initiated at 0 and updated whenever a block is installed or processed. The occupancy counter may be incremented by 1 with every newly installed block and decreased by 1 with every processed block. In an example, if the occupancy counter is less than 0, the occupancy counter may be set to 0, meaning all portions of the cache memory are open for new arriving data blocks. A large occupancy counter value may indicate that the processing rate is slower than the installing rate, i.e., the rate at which the processor is processing data is lower than the rate at which data blocks are being directed to the cache memory. As such, there may be many newly installed data blocks in the cache memory that are yet to be processed.

In another example, the occupancy level may be determined by the addition of a bit associated with each cache line. If a data block is touched by a processor, the bit may be set to 1. When a new data block is received, a check for an existing block with a set bit order may be searched for in order to be evicted. For example, the check may be performed by a cache controller. If there is not existing block with a set bit order for eviction, the newly received data block may be forwarded to a main memory without being installed in the cache memory. If there is an existing block with a set bit order, the existing block may be evicted to the main memory and the newly received data block may be installed in the cache memory.

At block 306, the cache controller may determine if the occupancy level of the cache memory is above a threshold. The cache controller may check the occupancy level indicator of an occupancy counter corresponding to the occupancy level of a cache memory and may direct the data block based on the occupancy level indicator. If the occupancy level of the cache memory exceeds a threshold, the received data block may be directed to a main memory. If the occupancy level of the cache memory is below a threshold, the received data block may be directed to the cache memory. The threshold may be set by a designer. In another example, the threshold may be calculated, such as by a processor or a cache controller. A cache controller may receive the occupancy level information from an occupancy counter. The cache controller may direct the processor to store incoming data blocks in the cache memory or the main memory based on the occupancy level information. In another example, the cache controller may direct incoming data blocks to the cache memory or the main memory based on the occupancy level information. In another example, the cache controller may provide the occupancy level information to the processor and the processor may direct the incoming data blocks based on the occupancy level information.

If the occupancy level is above the threshold, the data block may be directed to a main memory at block 308. The data block may be moved from the main memory upon request by the processor if a position in the cache memory becomes available. If the occupancy level is below the threshold, the data bock may be directed to the cache memory at block 310.

Figure 4:
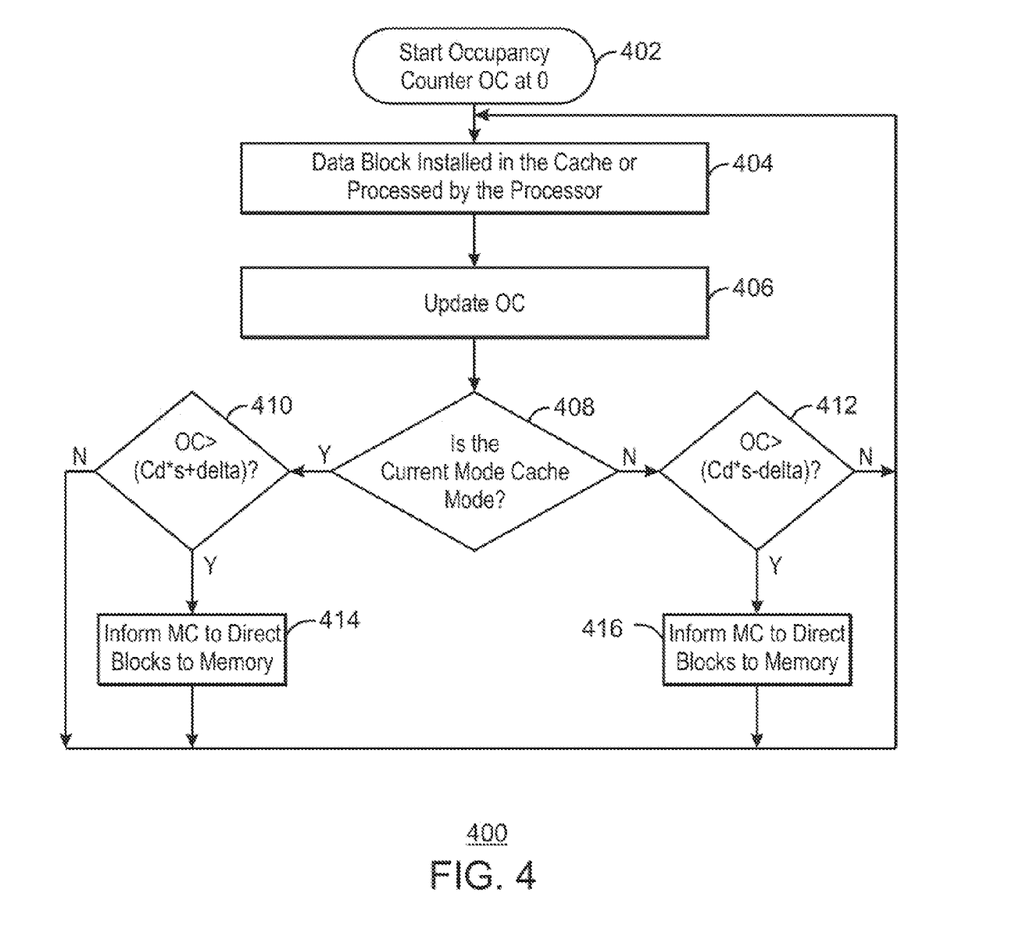
FIG. 4 is a process flow diagram of a method of directing data to a processor cache.

FIG. 4 is a process flow diagram of a method of directing data to a processor cache. The method 400 may be implemented by logic included, for example, in the computing device 200 of FIG. 2. The logic is embodied in hardware, such as logic circuitry or one or more processors configured to execute instructions stored in a non-transitory, computer-readable medium, for example. An occupancy counter may be included in a cache controller to track the occupancy level of a cache memory. In an example, the occupancy counter may be implemented in a cache controller included in the cache memory. A processor may communicate with the cache memory via the cache controller. The method may begin at block 402, wherein the occupancy counter may be set to 0, signaling all of the cache memory is available.

At block 404, a data block, such as an IO block, may be installed in the cache memory. In another example, a data block, such as an IO block, may be processed from the cache memory by a processor. The cache memory may be a multi-level cache memory. In an example, the cache memory may be a last level cache (LLC).

At block 406, the occupancy counter may be updated. For example, the occupancy counter may be increased by 1 when a data block is installed in the cache memory. In another example, the occupancy counter may be decreased by 1 when a data block is processed from the cache memory. In another example, the occupancy counter may increase and decrease an occupancy level indicator corresponding to the occupancy level of a cache memory based on installing data Docks in the cache memory and processing data blocks from the cache memory.

At block 408, the current mode may be determined. For example, if the current mode is a cache mode, the processor may currently be set to direct incoming data blocks to a cache memory. In another example, if the current mode is a main memory mode, the processor may be set to direct incoming data blocks to a main memory. The mode may be determined by the processor. In another example, the mode may be determined by a cache controller, such as a cache controller included in the cache memory. If the current mode is cache mode, the process flow advances to block 410.

At block 410 a controller, such as a cache controller, may determine if the occupancy level of the cache memory is above a threshold. In another example, the determination of whether the occupancy level is above a threshold may be made by a cache controller. The threshold may be a value set by a designer. In another example, the threshold may be calculated, such as by a computing device. In particular, the threshold may be calculated by a processor, such as a processor included in the computing device, or by a cache controller included in the cache memory.

The data within a cache memory may be uniformly distributed. If the data is uniformly distributed, the cache memory may be filled with unprocessed blocks when the occupancy level is greater than or equal to the total capacity, Cd, of the cache memory. However, if data is not uniformly distributed within the cache memory, evicting an unprocessed IO block may happen even when the occupancy level is smaller than, but approaching the total capacity of the cache memory. To account for non-uniform data distribution in the cache memory the threshold may be determined based, in part, on a scaling factor, s, that reduces the threshold in proportion to the level of non-uniformity. In some embodiments, the scaling factor, s, may be a value in a range from 0 to 1. The scaling factor may be selected by a designer or a user or selected automatically by a computing device or a component thereof. With the inclusion of the scaling factor, the threshold may be equal to the total capacity of the cache memory, Cd, multiplied by the scaling factor, s, to account for a non-uniform data distribution in the cache memory. If the occupancy level is greater than or equal to Cd multiplied by s, the data may be directed to the main memory, i.e. main memory mode. If the occupancy level is less than Cd multiplied by s, the data may be directed to the cache memory (cache mode) in order to speed up processing.

To avoid oscillation between memory mode and cache mode, a guard band, i.e. Delta, may be defined. The guard band may be a pair of values defined around the threshold such that if the occupancy level of a cache memory exceeds the threshold by the value of the guard band or more, a mode switch may be triggered and the mode will be changed. As such, the data block destination, cache or main memory, will be changed. If the occupancy level exceeds the threshold, but is still within the value defined by the guard band, the mode, and resulting data block destination, will not be changed. For example, if the current mode is cache mode and an occupancy level exceeds the threshold by greater than the amount specified by the guard band, the mode may be switched to main memory mode. Delta may be defined, such as by a designer, a user, or the computing device.

Both the scaling factor, s, and guard band, Delta, may be used in defining the threshold. For example, the threshold may be defined as the total capacity of the cache memory, Cd, multiplied by the scaling factor, s, and added to the guard band, Delta. At block 410, the cache controller may determine if the occupancy level is greater than the threshold. A data block destination based on an occupancy level indicator corresponding to the occupancy level may be set and the data block may be directed based on the data block destination. If the occupancy level crosses the threshold and a change in the occupancy level is within a guard band, the mode or data block destination is not changed. In an example, the controller may determine whether the occupancy level crosses the threshold and a change in the occupancy level exceeds an amount defined by a guard band, the mode, and corresponding data block destination, may be changed. In an example, the controller may determine if the occupancy level is greater than the total capacity of the cache memory, Cd, multiplied by the scaling factor, s, and added to the guard band, Delta. If the occupancy level is not greater than the total capacity of the cache memory, Cd, multiplied by the scaling factor, s, and added to the guard band, Delta, the method 400 may return to block 404, described above. If the occupancy level is greater than the total capacity of the cache memory, Cd, multiplied by the scaling factor, s, and added to the guard band, Delta, the process flow advances to block 414 and the data block may be directed to the main memory. For example, a memory controller may be informed to direct data blocks to the main memory, such as by the processor or the cache controller. After the data block has been directed to the main memory, the method 400 may return to block 404 above.

If the mode is not determined to be cache mode at block 408, the cache controller may determine if the occupancy level is below the threshold at block 412. For example, the cache controller may determine if the occupancy level is less than the total capacity of the cache memory, Cd, multiplied by the scaling factor, s, and added to the guard band, Delta. If the occupancy level is below the threshold, the process flow may advance to block 416 and the data blocks may be directed to the cache memory. For example, a memory controller may be informed to direct the data blocks to the cache, such as by a processor. After directing the blocks to the cache memory, the method 400 may return to block 404. If the occupancy level is not below the threshold, the method 400 may immediately return to block 404.

EXAMPLE 1

A computing device is described herein. The computing device may include a processor, a main memory coupled to the processor, and a cache memory coupled to the processor. The computing device may also include a cache controller to receive a data block from an I/O interface and selectively direct the data block to the main memory or the cache memory based on an occupancy level.

The cache controller may direct the data block to the main memory if the occupancy level exceeds a threshold. The cache controller may direct the data block to the cache memory if the occupancy level is below a threshold. An occupancy counter may be coupled to the cache controller to track the occupancy level of the cache memory. The cache controller may direct the data block to the main memory when the occupancy level is greater than or equal to a total capacity of the cache memory multiplied by a scaling factor. The cache controller may direct the data block to the cache memory when the occupancy level is less than a total capacity of the cache memory multiplied by a scaling factor. The occupancy counter may increase an occupancy level indicator corresponding to the occupancy level when a data block is directed to the cache memory and decrease the occupancy level indicator when a data block is processed from the cache memory. The cache controller may set a data block destination based on an occupancy level indicator corresponding to the occupancy level, and when the data block is received, direct the data block based on the data block destination. The cache controller may change the data block destination if the occupancy level is above a threshold and exceeds the threshold by an amount defined by a guard band. The cache controller may make no change to the data block destination if the occupancy level is above a threshold and the occupancy level is within a guard band about the threshold.

EXAMPLE 2

A processor is described herein. The processor may include a cache memory and a cache controller. The cache controller may track an occupancy level of the cache memory and direct a data block to the cache memory if the occupancy level is below a threshold.

The cache controller may direct the data block to a main memory if the occupancy level of the cache memory exceeds a threshold. An occupancy counter may be coupled to the cache controller to track the occupancy level. The occupancy counter may increase an occupancy level indicator corresponding to the occupancy level when a data block is directed to the cache memory and decrease the occupancy level indicator when a data block is processed from the cache memory. The cache controller may direct the data block to the cache memory when the occupancy level is less than the total capacity of the cache memory multiplied by a scaling factor. The cache controller may direct the data block to a main memory when the occupancy level is greater than or equal to a total capacity of the cache memory multiplied by a scaling factor. The cache controller may set a data block destination based on an occupancy level indicator corresponding to the occupancy level, and when the data block is received, direct the data block based on the data block destination. The cache controller may change the data block destination if the occupancy level is above a threshold and exceeds the threshold by an amount defined by a guard band. The cache controller may make no change to the data block destination if the occupancy level is above a threshold and the occupancy level is within a guard band about the threshold.

EXAMPLE 3

A device is described herein. The device may include logic to receive a data block from an I/O interface and logic to determine an occupancy level of a cache memory. The device may also include logic to direct the data block to a main memory if the occupancy level exceeds a threshold and to a cache memory if the occupancy level is below a threshold.

The device may include logic to track the occupancy level using an occupancy counter. The occupancy counter may be implemented in a cache controller of the cache memory. The device may include logic to increase an occupancy level indicator corresponding to the occupancy level when a data block is directed to the cache memory and decrease the occupancy level indicator when a data block is processed. The device may include logic to multiply a total capacity of a cache memory by a scaling factor to account for a non-uniform data distribution in the cache memory. The device may include logic to, when the data block is received, check an occupancy level indicator corresponding to the occupancy level and direct the data block based on the occupancy level indicator. The device may include logic to set a data block destination based on an occupancy level indicator corresponding to the occupancy level, and when the data block is received, direct the data block based on the data block destination. The device may include logic to change the data block destination if the occupancy level crossed the threshold and exceeds the threshold by an amount defined by a guard band. The data block destination may not be changed if the occupancy level crosses the threshold and the occupancy level is within a guard band about the threshold.

In the foregoing description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A computing device, comprising:
a processor;
a main memory coupled to the processor;
a cache memory coupled to the processor; and
a cache controller to receive a data block from an I/O interface and selectively direct the data block to the main memory or the cache memory based on a comparison of an occupancy level of the cache memory with a threshold cache occupancy level, wherein the occupancy level of the cache is determined, at least in part, by a number of data blocks that have been transferred to the cache memory for the I/O interface via Direct Memory Access (DMA), wherein the data block is directed to the cache memory and bypasses the main memory if the occupancy level is below the threshold cache occupancy level.

2. The computing device of claim 1, the cache controller to direct the data block to the main memory if the occupancy level exceeds a threshold.

3. The computing device of claim 1, the cache controller to direct the data block to the cache memory if the occupancy level is below a threshold.

4. The computing device of claim 1, wherein an occupancy counter is coupled to the cache controller to track the occupancy level of the cache memory.

5. The computing device of claim 1, wherein the cache controller is to direct the data block to the main memory when the occupancy level is greater than or equal to a total capacity of the cache memory multiplied by a scaling factor.

6. The computing device of claim 1, wherein the cache controller is to direct the data block to the cache memory when the occupancy level is less than a total capacity of the cache memory multiplied by a scaling factor.

7. The computing device of claim 1, wherein the occupancy counter is to increase an occupancy level indicator corresponding to the occupancy level when a data block is directed to the cache memory and to decrease the occupancy level indicator when a data block is processed from the cache memory.

8. The computing device of claim 1, wherein the cache controller is to set a data block destination based on an occupancy level indicator corresponding to the occupancy level, and when the data block is received, to direct the data block based on the data block destination.

9. The computing device of claim 8, wherein the cache controller is to change the data block destination if the occupancy level is above a threshold and exceeds the threshold by an amount defined by a guard band.

10. The computing device of claim 8, wherein the cache controller is to make no change to the data block destination if the occupancy level is above a threshold and the occupancy level is within a guard band about the threshold.

11. A processor, comprising:
a cache memory; and
a cache controller to receive a data block from an I/O interface, to track an occupancy level of the cache memory, and to bypass a main memory and direct the data block to the cache memory if the occupancy level is below a threshold cache occupancy level, wherein the occupancy level of the cache is determined, at least in part, by a number of data blocks that have been transferred to the cache memory for the I/O interface via Direct Memory Access (DMA).

12. The processor of claim 11, wherein the cache controller is to direct the data block to a main memory if the occupancy level of the cache memory exceeds a threshold.

13. The processor of claim 11, wherein an occupancy counter is coupled to the cache controller to track the occupancy level.

14. The processor of claim 13, wherein the occupancy counter is to increase an occupancy level indicator corresponding to the occupancy level when a data block is directed to the cache memory and decrease the occupancy level indicator when a data block is processed from the cache memory.

15. The processor of claim 11, wherein the cache controller is to direct the data block to the cache memory when the occupancy level is less than the total capacity of the cache memory multiplied by a scaling factor.

16. The processor of claim 11, wherein the cache controller is to direct the data block to a main memory when the occupancy level is greater than or equal to a total capacity of the cache memory multiplied by a scaling factor.

17. The processor of claim 11, wherein the cache controller is to set a data block destination based on an occupancy level indicator corresponding to the occupancy level, and when the data block is received, to direct the data block based on the data block destination.

18. The processor of claim 17, wherein the cache controller is to change the data block destination if the occupancy level is above a threshold and exceeds the threshold by an amount defined by a guard band.

19. The processor of claim 17, wherein the cache controller is to make no change to the data block destination if the occupancy level is above a threshold and the occupancy level is within a guard band about the threshold.

20. A device comprising:
logic to receive a data block from an I/O interface;
logic to determine an occupancy level of a cache memory; and
logic to direct the data block to a main memory if the occupancy level exceeds a threshold occupancy level; and
logic to bypass the main memory and direct the data block to a cache memory if the occupancy level is below a threshold cache occupancy level;
wherein the occupancy level of the cache is determined, at least in part, by a number of data blocks that have been transferred to the cache memory for the I/O interface via Direct Memory Access (DMA).

21. The device of claim 20, comprising logic to track the occupancy level using an occupancy counter.

22. The device of claim 21, wherein the occupancy counter is implemented in a cache controller of the cache memory.

23. The device of claim 20, comprising logic to increase an occupancy level indicator corresponding to the occupancy level when a data block is directed to the cache memory and decrease the occupancy level indicator when a data block is processed.

24. The device of claim 20, comprising logic to multiply a total capacity of a cache memory by a scaling factor to account for a non-uniform data distribution in the cache memory.

25. The device of claim 20, comprising logic to, when the data block is received, check an occupancy level indicator corresponding to the occupancy level and logic to direct the data block based on the occupancy level indicator.

26. The device of claim 20, comprising logic to set a data block destination based on an occupancy level indicator corresponding to the occupancy level, and when the data block is received, logic to direct the data block based on the data block destination.

27. The device of claim 26, comprising logic to change the data block destination if the occupancy level crossed the threshold and exceeds the threshold by an amount defined by a guard band.

28. The device of claim 26, wherein the data block destination is not changed if the occupancy level crosses the threshold and the occupancy level is within a guard band about the threshold.

29. The device of claim 20, wherein the cache memory is a last level cache (LLC).

\* \* \* \* \*